Patented Jan. 8, 1929.

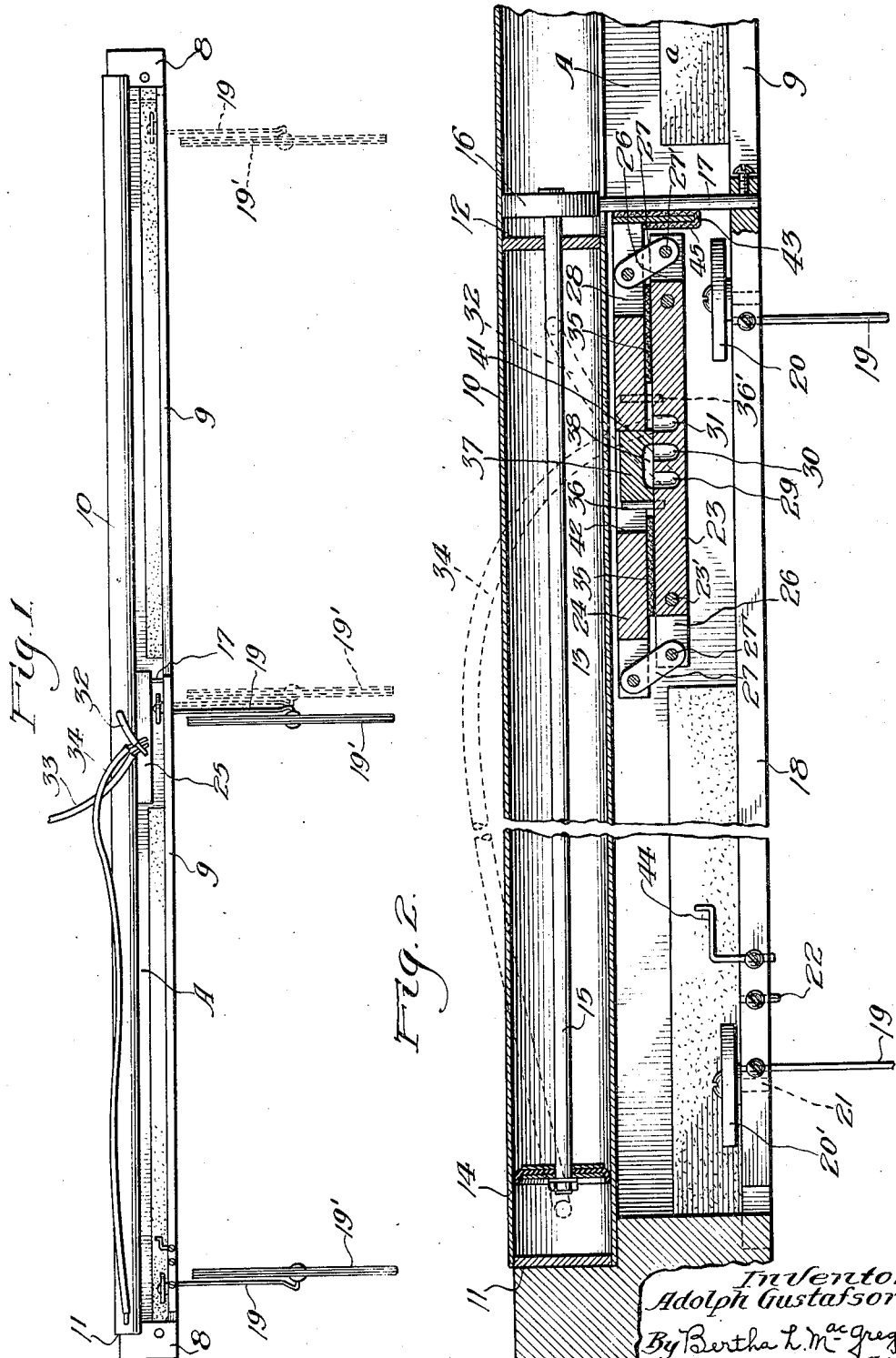

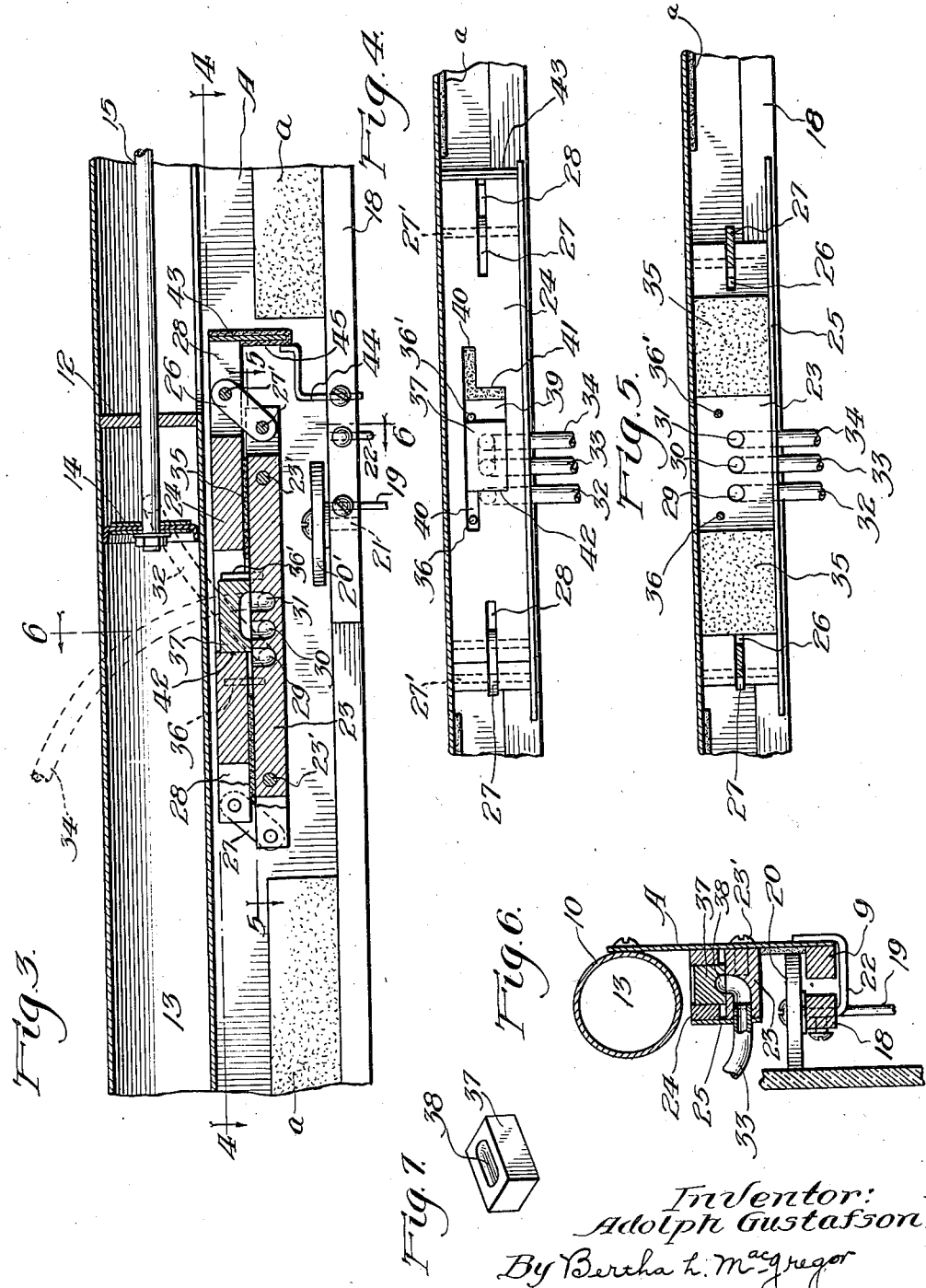

1,697,911

UNITED STATES PATENT OFFICE.

ADOLPH GUSTAFSON, OF CHICAGO, ILLINOIS, ASSIGNOR TO M. SCHULZ CO., OF CHICAGO, ILLINOIS, A CORPORATION OF ILLINOIS.

WINDSHIELD CLEANER.

Application filed March 5, 1928. Serial No. 259,354.

This invention relates to power operated window cleaning devices and more particularly to that type of device adapted to be applied to windshields of automobiles, in which the suction created in the intake pipe of a combustion engine is utilized for acting upon a movable piston to which the cleaning devices are operatively connected.

One of the objects of the invention is to produce a cleaning device which will function to cleanse the entire windshield and in which the wipers are vertically disposed and adapted to be reciprocated in parallel relation to each other. Another object is to so arrange the wipers that the path of travel of one will overlap, to at least a slight degree, the path of travel of the adjacent wiper, by which a perfectly clean windshield is assured.

An important feature of my invention is the provision of an exceedingly simple valve mechanism by which the source of suction is alternately directed to one or the other side of the piston cylinder to move the piston therein, said valve mechanism being located exteriorly of the cylinder.

Another advantage of my invention lies in the fact that the windshield area to be cleaned is not limited by any pivotal connection between the wipers and operative mechanism, as is the case in devices of the oscillating type; nor is it curtailed by the limited stroke of the piston or size of cylinders, as in those constructions wherein valve mechanisms and other operative parts are located in the cylinder, or the wipers are connected directly to the piston or piston rod.

Another advantage lies in the arrangement of parts whereby the valve mechanism and operative connections between piston and wipers, and the means for operating the valves are located outside of the cylinder and may be readily inspected and repaired.

In that embodiment of my invention which I have chosen to illustrate in the drawings:

Figure 1 is a front elevation of a device embodying my invention, as viewed by the driver of an automobile equipped with the same.

Figure 2 is an enlarged view, broken away, and partially in longitudinal vertical section, to show the position of the piston and valve mechanism when one of the wipers is at the left hand side and the other near the center of the windshield.

Figure 3 is an enlarged view, similar to Figure 2, but showing the position of the parts when the wipers have been moved toward the right of the windshield.

Figure 4 is a horizontal, sectional view, taken in the plane of 4—4 of Figure 3, looking downwardly as indicated by the arrows.

Figure 5 is a view similar to Figure 4, but taken in the plane of the line 5—5 of Figure 3, looking downwardly as indicated by the arrows.

Figure 6 is a transverse, vertical sectional view taken in the place of the line 6—6 of Figure 3, looking in the direction indicated by the arrows.

Figure 7 is a perspective view of a part of the valve mechanism.

In the drawings, A is a support adapted to be connected to a fixed portion of an automobile just above the windshield. Said support A comprises a relatively long, flat piece of metal with attaching blocks 8 at each end and a track member 9, preferably rectangular in cross section, extending across the lower portion of the support A.

A tube 10 is connected to the support. It has a closed end 11 and a interior disc or partition 12 located about midway between the ends of the tube, whereby is formed a closed cylinder 13 toward the left end of the tube. In the cylinder 13 is a piston 14 which engages the tubular walls 10 and is adapted to be reciprocated in said cylinder. The piston 14 is connected to one end of a rod 15, the other end of which extends through an aperture in the disc 12 and has connected thereto a block 16 which acts as a guide or support for the end of the piston rod 15. This block 16 also forms a connection between the end of the piston rod 15 and a vertically disposed rod 17 which extends downwardly through a longitudinal slot in that part of the tube 10 to the right of the partition 12. This right hand end of the tube 10, beyond the partition 12, need not be tubular in form and the block 16, which is circular in shape in the present embodiment, may take any desired form, so long as it is adapted to slide in the right hand end of the guide now shown as a tube 10. The function of the part 16 is merely to guide the end of the piston rod and form a connection between it and the vertically disposed rod 17.

The lower end of the rod 17 is rigidly connected to a horizontally disposed bar 18, to which are secured a plurality of wires 19 for holding wipers 19'. The bar 18 is in the same plane as and directly in front of the fixed track 9, being held in its intended position by the bar 17 and by a pair of anti-friction guide rollers 20. One roller 20 is located near each end of the bar 18, being mounted thereon by a headed bolt 21. One face of the roller 20 rests on top of the fixed track 9, the edge 20' rolling upon a strip of felt $a$ connected to the support A. The bar 18 is also held against the track 9 by a U-shaped clip 22, the upright members of which engage the front face of the bar 18 and the opposite face of the support A.

It will be understood that when the piston 14 is in the position shown in Figures 1 and 2, the movable bar 18 will be toward the left hand side and one of the wiper holding wires 19 will be at the extreme left and the other slightly to the left of the center of the windshield. When the piston 14 is made to travel toward the right, the piston rod 15, guide 16 and connecting rod 17 will also move to the right and draw the bar 18 in the same direction, the rollers 20 rotating and moving over the track 9, bringing the wipers 19' into the positions shown in dotted lines in Figure 1. The wipers are so spaced on the bar 18 that the paths of travel of each will slightly overlap that of the other at the center of the windshield.

Located about midway between the ends of the support A, between the tube 10 and track 9, is a valve mechanism shown in longitudinal, vertical sections in Figures 2 and 3 and in horizontal sections in Figures 4 and 5. It comprises a stationary lower portion 23 secured to the support A by screws 23', and a movable upper portion 24, a front wall 25 being attached to the fixed portion 23 and extending upwardly to cover the front of the movable portion. The ends of the stationary member 23 are provided with inwardly extending recesses 26 and in each recess is pivotally mounted a link 27 on a pin 27'. The ends of the movable member 24 are similarly recessed, as indicated at 28, and the other end of each of the links 27 is pivotally mounted on pins 27' in each of said recesses 28, thereby movably connecting the valve members 23 and 24.

Any kind of connection permitting one valve member to have movement longitudinally with respect to the other would suffice, but the form of connection shown and described is particularly desirable because it insures quick action of the movable part 24 with respect to the fixed part 23; that is to say, when pressure is applied at one end of the movable portion 24 to move it from the position shown in Figure 2 to that of Figure 3, and vice versa, there will be a quick, positive movement, assisted by gravity, toward the end of the stroke after the links 27 have reached a point slightly past center or vertical position.

The stationary part 23 of the valve is provided with three ports 29, 30 and 31, facing upwardly toward the movable member 24 and connecting with conduits 32, 33 and 34, respectively, which extend outwardly from the face 25 of the valve. 35 indicates felt padding between the valve members. A pair of stop pins 36, 36', extend upwardly out of the top surface of the member 23.

On top of the fixed member 23, between the pins 36 and 36', there is a slidable block 37, more clearly shown in Figure 7. This block 37 is placed so that its grooved face 38 is downwardly in contact with the top surface of the valve member 23 just over the ports 29, 30 and 31. The groove 38 is of such width and length that its walls form a connecting conduit for two of the ports, either the ports 29 and 30 or 30 and 31, depending on the position of the block 37.

To accommodate the block 37, the upper movable member 24 is recessed or cut away, as indicated at 39. The width of the recess is such that the block 37 fits in the rectangular opening, and its length is about one-third greater than the length of the block 37. Opening into the recess 39, at each end thereof, is a narrow slot 40, one of which accommodates the pin 36 and the other the pin 36', as best shown in Figure 4.

When the valve member 24 is moved into the position shown in Figure 2, the wall 41 of the recess 39 will contact with one side of the block 37 and push said block toward the left hand side until it contacts with the stop pin 36, in which position the walls of the groove 38 form a connecting conduit for the conduits 32 and 33 by overlying the ports 29 and 30; and that when the valve member 24 is moved to the position shown in Figures 3, 4 and 5, the wall 42 of the recess 39 will contact with the other side wall of the block 37 and push the block to the right until it contacts with the stop pin 36', in which position the walls of the groove 38 overlie the ports 30 and 31 and form a connecting conduit between the conduits 33 and 34.

The means for operating the valve mechanism is as follows: rigidly secured to the right hand side of the valve member 24 is a downwardly extending, felt covered shoulder 43 adapted to be engaged by the vertical bar 17 when it moves with the piston 14 from the right to the left. When said bar 17 contacts with the shoulder 43, it moves the valve member 24 into the position shown in Figure 2. When the piston 15 is caused to reverse and move toward the right, as will be hereinafter explained, carrying with it (through rod 15, connection 16 and bar 17) the wiper carrying bar 18, a bent contact arm 44 attached to the movable bar 18, will come into engagement with the side wall 45 of the shoulder 43 of the valve member 24, causing said member to move toward the right to the position shown in Figure 3.

The actuating of the valve mechanism is intended to occur when the piston has reached the end of each stroke, and not while it is still in motion. The bar 17 and arm 44, which alternately contact with the shoulder 43 on the movable valve member, are so located on the connecting parts between the piston and wipers, that they engage said movable valve member and push it only the short distance required to carry the links 27 into a position slightly past the vertical or center. Thereupon, although the piston and connected parts have come to rest, the links 27 and valve member 24 will drop by gravity and move into the reversed position. It will be noted that the block 37 will not come into contact with either wall 41 or 42 of recess 39, to be actuated thereby, until the end movement of the movable valve member 24, when links 27 have passed center.

The piston 14, which through its connections operates the wipers and controls the valve mechanism, is made to reciprocate by utilizing the vacuum created in the intake pipe of an internal combustion engine in a manner well known in the art. The conduit 33 is connected to the intake manifold of the engine to receive vacuum therefrom. The conduit 34 is connected to one end of the cylinder 13, as shown, to the left of the piston 14, and the conduit 32 is connected with the other end of the cylinder, to the right of the piston 14.

The operation of my device is as follows: Assume that the piston 14 and its connections to the bar 18 and the wipers 19' are in the position shown in Figures 1 and 2, that is, toward the left hand side of the windshield, as viewed by the driver of a car. When the parts are brought into this position, the bar 17 contacts with the shoulder 43 of the movable valve member 24, pushing it to the left, causing the recess wall 41 to contact with one side of block 37 to move it to and against stop pin 36, so that the groove 38 overlies ports 29 and 30 in the valve member 23, and connects conduits 32 and 33, thereby subjecting the right hand side of the cylinder 13 to the influence of vacuum through conduit 32, and exposing port 31 so that the left hand side of the cylinder is in communication with the atmosphere through conduit 34. Under the influence of this vacuum in the right hand side of the cylinder 13, the piston 14 will be drawn toward the right from the position shown in Figure 2 to that of Figure 3, carrying with it the vertical bar 17, movable bar 18 and wipers 19'.

When the piston 14 nears the end of its stroke toward the right, the arm 44 of the bar 18 comes into contact with the face 45 of the shoulder 43 on valve member 24, pushing said member toward the right into the position shown in Figure 3, the wall 42 of the recess 39 engaging one side of the block 37 and moving it toward and against the pin 36', in which position it overlies ports 30 and 31, and through its groove 38 connects the conduits 33 and 34. By this action, the source of vacuum through conduit 33 is connected through conduit 34 with the left hand side of the cylinder, and since the port 29 is now exposed, conduit 32 places the right hand side of the cylinder 13 in communication with the atmosphere. Suction now being applied to the left hand side of the cylinder, through conduit 34, the piston is drawn toward the left from the position shown in Figure 3 to that of Figure 2, and the parts assume the position first referred to in the explanation of operation.

The mechanism described will be neatly covered and be invisible to the occupants of the car.

Changes in details of construction may be made without departing from the scope of my invention, and I do not intend to be limited to the exact form shown and described, except as pointed out in the appended claims.

I claim as my invention:

1. A window cleaning device comprising a cylinder, heads closing the ends thereof, a piston movable therein, a wiper carrying bar operatively connected to the piston and extending parallel with said cylinder, valve mechanism located exteriorly of the cylinder and adjacent said bar, conduits connecting the valve mechanism to opposite ends of the cylinder, means connecting the valve mechanism to a source of suction, means exteriorly of said cylinder for actuating said valve mechanism to alternately connect said conduits with the source of suction, and a pair of wipers connected to said bar between and within the ends of said cylinder, whereby on full stroke of said piston each wiper is caused to overlap the path traveled by the other.

2. A window cleaning device comprising a cylinder, a piston movable therein, a piston rod extending beyond the end of the cylinder, a wiper carrying bar operatively connected to the piston rod, a wiper carried by said bar near each end thereof, valve mechanism, conduits connecting said valve mechanism to opposite ends of the cylinder, means connecting the valve mechanism to a source of suction, and means on the wiper carrying bar on one side of each wiper for actuating said valve mechanism to alternately connect said conduits to the source of suction, whereby each wiper is caused to overlap the path traveled by the other.

3. A window cleaning device comprising a support, a cylinder mounted thereon, a piston movable in the cylinder, a piston rod extending beyond one end of the cylinder, a track on the support parallel to the axis of the cylinder, a wiper carrying bar operatively connected to the piston and supported on said track, valve mechanism, conduits connecting said valve mechanism to opposite ends of the cylinder, means connecting the valve mechanism to a source of suction, and means on the wiper carrying bar for actuating said valve mechanism to alternately connect said conduits with the source of suction.

4. A window cleaning device comprising a support, a cylinder mounted thereon, a piston movable in the cylinder, a piston rod extending beyond one end of the cylinder, a track on the support parallel to the axis of the cylinder, a wiper carrying bar having a pair of rollers movably supported on said track, valve mechanism, conduits connecting said valve mechanism to opposite ends of the cylinder, means connecting the valve mechanism to a source of suction, and means on the wiper carrying bar for actuating said valve mechanism to alternately connect said conduits with the source of suction.

5. In a window cleaning device, a cylinder, a piston movable therein, a wiper operatively connected with the piston, valve mechanism comprising a member connected through conduits to opposite ends of the cylinder and to a source of suction, said conduits having ports in one surface of the valve member, stop pins extending from said surface, a grooved movable valve member of a length sufficient to cover two of said ports mounted to slide on said first member, and means actuated by the piston for shifting said movable member between said stop pins.

6. In a window cleaning device, a cylinder, a piston movable therein, a wiper operatively connected with the piston, valve mechanism comprising a pair of members longitudinally movable with respect to each other, links pivotally connected at each end to said valve members, one of said members being provided with ports and conduits connecting said ports with opposite ends of the cylinder, a third port connected to a source of suction, the other valve member forming means for alternately connecting said first mentioned ports with the port to the source of suction, and means for automatically actuating said valve member.

7. In a window cleaning device, a cylinder, a piston movable therein, a wiper operatively connected to the piston, valve mechanism comprising a member connected with opposite ends of the cylinder and with a source of suction, a movable block, alternately forming a connecting passageway between the source of suction and opposite ends of the cylinder, a second valve member having a recess therein longer than the block to receive the same, a pair of links pivotally connected to said two valve members, and means for actuating said recessed valve member to bring one of its recess walls into engagement with and to move said second valve member.

8. In a window cleaning device, a cylinder, a piston movable therein, a wiper operatively connected with the piston, valve mechanism comprising a stationary member having a plurality of ports in one surface, two of said ports being connected with opposite ends of the cylinder, a conduit from one port to a source of suction, a grooved block movably mounted on said valve member to overlie two of said ports, a recessed member, a pair of links pivotally connected to said first mentioned valve member and to the recessed member, opposite walls of the recess being adapted to alternately engage said grooved block to shift the position of same and means for actuating said recessed member.

In testimony that I claim the foregoing as my invention I affix my signature this 29th day of February, 1928.

ADOLPH GUSTAFSON.